March 26, 1968   W. H. HORTON ET AL   3,374,719
STORAGE AND ACTUATING MEANS FOR FLASH MECHANISM
Filed July 12, 1965

WILLIAM H. HORTON
JAMES E. DIERKS
INVENTORS

BY R. Frank Smith
Thomas R. Lampe
ATTORNEYS

United States Patent Office 3,374,719
Patented Mar. 26, 1968

3,374,719
STORAGE AND ACTUATING MEANS FOR FLASH MECHANISM
William Howard Horton and James Edward Dierks, Rochester, N.Y., assignors to Eastman Kodak Company, Rochester, N.Y., a corporation of New Jersey
Filed July 12, 1965, Ser. No. 471,178
5 Claims. (Cl. 95—11)

ABSTRACT OF THE DISCLOSURE

In a photographic camera, a socket for a multilamp flash package and means for manually moving the socket and package from a storage recess in the camera where the socket and package are stored when flash operation is not desired, to the exterior of the camera when flash operation is desired. The socket is automatically placed in the camera flash synchronizing circuit when brought to the exterior position.

---

This invention relates to a photographic camera of the type utilizing a multilamp flash attachment. An attachment of this type is shown in copending Kottler et al. U.S. application Ser. No. 417,914, now Patent No. 3,327,105, filed on Dec. 14, 1964. More particularly, the invention relates to means for storing a flash attachment having a series of flash lamp elements or bulbs therein when use thereof is not desired by the operator and means for manually placing said attachment in operating position.

In the photographic industry a recent phenomenon has been the increased use of multi-lamp flash attachments of the type disclosed in the aforementioned Kottler et al. application. In previous camera designs for utilization with such attachments no provision has been made for storing such attachments in the camera when use is not desired. Accordingly, the operator must either manually remove such attachment from the camera or leave it in an exposed position where it is subjected to unnecessary wear and tear. If the operator has chosen to remove the attachment, it may not be readily accessible when use of the flash is again desired.

It is therefore an object of this invention to provide means whereby an attachment of this type may be readily stored in an associated camera when use thereof is not desired.

It is a further object of this invention to provide means whereby a flash attachment may be manually removed from its storage position and placed in its use position wherein it is automatically placed in a suitable flash synchronizing circuit.

The above objectives have been attained by providing a socket arrangement for a multilamp flash attachment which may be lowered in an associated camera recess when use thereof is not desired and which may manually be brought to a use position wherein it is operatively associated with the camera flash synchronizing circuit.

Other objects of the invention will appear from the following description, reference being made to the accompanying drawings wherein.

Figure 1:
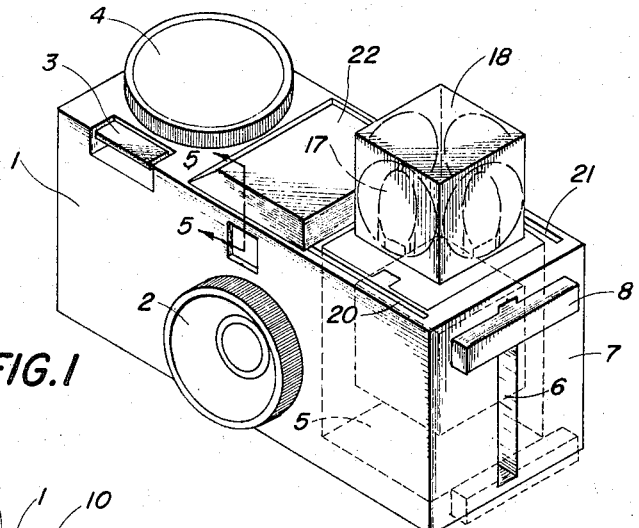
FIG. 1 is an isometric view of a camera having associated therewith a rotatable, disposable, multilamp flash attachment.

Referring now to FIG. 1, a camera 1 is shown having an objective lens 2, shutter release button 3 and a film winding member 4, all of which are well known in the camera art. For the purpose which will more fully be brought out below, a recess 5 is provided in the camera which communicates directly with vertical slot 6 in camera wall 7.

Figure 2:
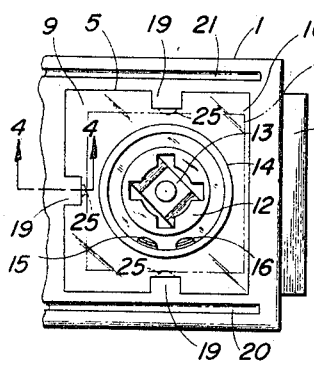
FIG. 2 is a partial plan view of the socket arrangement in a slightly enlarged scale showing the socket assembly operatively associated with the camera housing.
Figure 3:
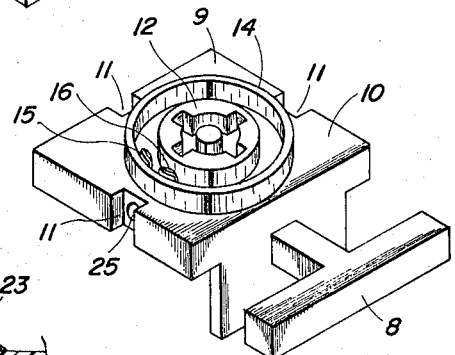
FIG. 3 is an isometric view of the socket assembly per se.

Disposed in the recess and having a bar-like member 8 in communication with the outside of said camera is socket assembly 9. As may be most clearly seen with reference to FIGS. 2 and 3, socket assembly 9 comprises a base 10 of substantially rectangular configuration having a plurality of recesses or grooves 11 therein. Projecting upwardly from base 10 is a socket member 12 which is adapted to receive a multilamp flash attachment 18 therein. A socket member of this type and its coaction with the multilamp flash attachment is more fully disclosed in the copending Williams et al. U.S. application Ser. No. 438,585, now Patent No. 3,335,651, filed Mar. 10, 1965. For the purposes of understanding the operation of the present device, it is necessary only to be aware that a projecting member of a multilamp flash attachment is yieldably positioined in socket member 12 by a clip spring element 13. The spring element comprises a member having two upstanding yieldable arms which engage the projecting member of the multilamp flash attachment and allow it to be manually withdrawn by the operator or to be positioned in 90° increments by the operator by merely twisting same.

A mounting ring 14 concentrically surrounds the socket member 12 and has imbedded therein a pair of contact terminals 15, 16. As is more fully explained in copending Beach U.S. application Ser. No. 458,016, filed May 24, 1965, the contact terminals are disposed to engage the lead-in wires (not shown) of the forward facing lamp 17 (FIG. 1) of the multilamp flash assembly 18. Base 10 of the socket assembly is positioned in recess 5 in the manner shown in FIG. 2 for free up and down movement therein. Recesses or grooves 11 of the assembly cooperate with ribs 19 to maintain stable movement of the socket assembly. Ribs 19 are integral with the camera casing and extend to the bottom of the camera. By manually grasping bar-like member 8 and pushing it downward to the position indicated in phantom in FIG. 1, the operator may position the socket assembly and the attached multilamp attachment to the position also indicated in phantom.

Figure 5:
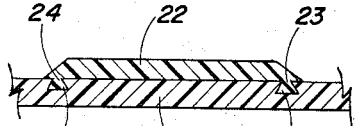
FIG. 5 is an enlarged partial, sectional view taken along line 5—5 of FIG. 1, showing cooperating elements of the camera housing and flash attachment cover.

Referring now to FIGS. 1 and 5, the top of the camera housing has a pair of dovetail slots 20, 21 therein. A cover 22 has a pair of depending members 23, 24 which cooperate with said slots and allow said cover to move longitudinally over the camera housing. When the socket assembly and the associated multilamp flash attachment are in their recessed condition, the cover may be slid over the recess 5. This arrangement serves to protect the mechanism and imparts a neat appearance to the camera.

When the multilamp assembly is in the raised position indicated in FIG. 1, it is necessary to connect the forward lamp to the camera flash synchronization circuit to effect the firing thereof upon depression of shutter release button 3. This connection is automatically made upon raising the socket assembly and multilamp flash assembly to their elevated positions in the following manner. Each of the recesses in base 10 has a detent 25 therein. Since there are three recesses or grooves disclosed in this instance, there are three detents as well. Ribs 19 have suitable projections 26 adapted to enter into said detents when the socket assembly has been moved by the operator to its uppermost position. In this manner, the assembly and multilamp flash attachment are held in position until the operator desires to move them to storage position once again. It is of course understood that the material of which the socket assembly and/or the ribs are constructed has sufficient yieldable and elastic characteristics to enable the members to be brought to such position. Many known plastic materials have such characteristics.

Figure 4:
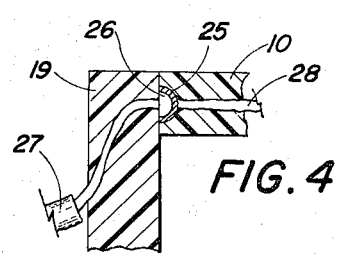
FIG. 4 is an enlarged partial, section view taken along line 4—4 of FIG. 2 showing cooperating elements of the socket assembly and the camera housing.

Two of the ribs 19 have wire leads 27 imbedded therein in the manner shown in FIG. 4. Leads 27 are connected at one end to projections 26 which are in this case constructed of any electrically conducting material. The other ends thereof are connected in circuit with a battery (not shown) and adapted to be placed in closed circuit therewith upon depression of the shutter release button in the well known manner. As may also be seen with reference to FIG. 4, detents 25, which are in operative association with the projections having leads 27 connected thereto, comprise cup-shaped members also constructed of electrically conductive material. Each of these cup-shaped members are connected to a wire lead 28 which is imbedded in base 10. One such lead is connected to previously described contact terminal 15 and the other to contact terminal 16 in mounting ring 14. It may thus be seen that two sets of detents 25 and projections 26 not only provide locking means for holding the socket assembly in elevated position but also constitute electrical connectors for placing the multi-lamp flash assembly in circuit with the remainder of the camera synchroflash system. These connections are broken upon movement of the socket assembly to its recessed position, and hence there is no possibility of inadvertent firing of the flash bulb after movement of the socket assembly to its recessed position. If, however, the mechanism is in its use position the operator need only depress the shutter release to take a photograph. The multilamp flash assembly may then be rotated 90° by the operator to position the next bulb in firing position.

Figure 6:
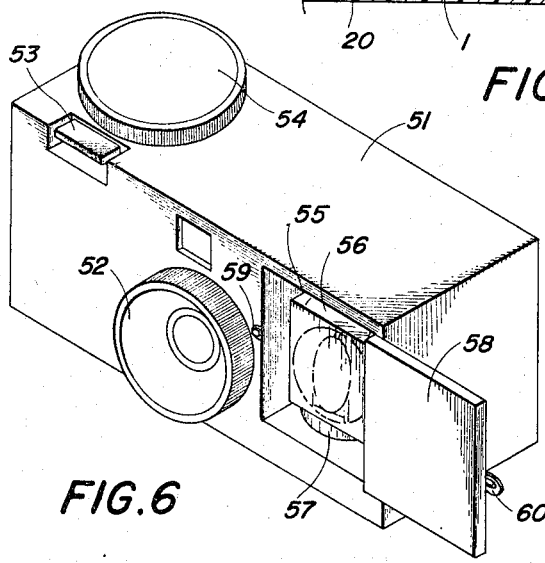
FIG. 6 is an isometric view of a camera incorporating an alternative embodiment of the invention.

FIG. 6 illustrates an alternative embodiment of the invention. A camera 51 is shown also having the conventional lens 52, shutter release button 53 and a film winding member 54. In this embodiment a recess 55 is provided for housing a multi-lamp flash attachment 56 and socket 57. Socket 57 is similar to that previously described but is fixed relative to the camera body. A door 58 is adapted to cover recess 55 and is opened (as shown) when use of the flash is desired. A suitable switching means (not shown) may be provided to cooperate with the door to inactivate the flash circuitry upon closing of the door. In a less expensive camera, however, the construction could be similar to that disclosed in this embodiment and all the operator need do to deactivate the circuit is pull the multilamp flash attachment partially free of the socket so that the electrical contacts thereof are no longer contacting the previously described terminals. The door may then be closed and fastened by any suitable latch means 59, 60 until use of the flash is once again desired.

The invention has been described in detail with particular reference to preferred embodiments thereof, but it will be understood that modifications and variations can be effected within the spirit and scope of the invention as described hereinabove and as defined in the appended claims.

What is claimed is:

1. In a photographic camera having a housing and a flash circuit, the combination comprising:
    a socket assembly for use with a multilamp flash attachment;
    a recess in said camera having longitudinal ribs therein and wherein said socket assembly includes a base member having recesses therein for sliding engagement with said ribs;
    means operably connected to said socket assembly whereby said assembly may be selectively positioned from a first position where it is in said recess to a second position exterior of said camera housing; and
    switch means for placing said socket assembly in circuit with said camera flash circuit when said socket assembly is in said second position.

2. The combination according to claim 1, wherein detent means are provided in said recesses and projections are provided on said ribs, said detents and said projections cooperating to yieldably retain said socket assembly in said second position.

3. The combination according to claim 2 wherein at least one of said detents and said projections constitute said switch means.

4. In a photographic camera having a housing and a flash circuit, the combination comprising:
    a recess in said camera housing having longitudinal ribs therein;
    a socket assembly for use with a multilamp flash attachment and including a base member having grooves therein for sliding engagement with said ribs;
    means operably connected to said socket assembly for moving said assembly between a first position in which a flash attachment carried on said assembly is within said recess to a second position in which a flash attachment carried on said assembly is exterior of said recess; and
    switch means for placing said socket assembly in circuit with said camera flash circuit when said socket assembly is in said second position.

5. The apparatus according to claim 4 including detent means on said ribs and grooves for cooperating to yieldably retain said socket assembly in said second position, said detent means constituting said switch means.

References Cited
UNITED STATES PATENTS

| | | | |
|---|---|---|---|
| 3,205,801 | 9/1965 | Peterson | 95—11.5 |
| 3,244,087 | 4/1966 | Anderson et al. | 240—1.3 XR |
| 3,302,542 | 2/1967 | Greger et al | 240—1.3 XR |

NORTON ANSHER, *Primary Examiner.*

F. L. BRAUN, *Assistant Examiner.*